United States Patent
Nguyen et al.

(10) Patent No.: US 11,578,254 B2
(45) Date of Patent: Feb. 14, 2023

(54) ALKYL ALKOXYLATED CARBOXYLATE SALTS AS STEAM FOAM ADDITIVES FOR HEAVY OIL RECOVERY

(71) Applicant: Sasol Performance Chemicals GmbH, Hamburg (DE)

(72) Inventors: Thu Nguyen, Westlake, LA (US); Renke Rommerskirchen, Hamburg (DE); Jorge Fernandez, Westlake, LA (US)

(73) Assignee: Sasol Chemicals GmbH, Hamburg (DE)

( * ) Notice: Subject to any disclaimer, the term of this patent is extended or adjusted under 35 U.S.C. 154(b) by 0 days.

(21) Appl. No.: 16/981,536

(22) PCT Filed: Mar. 15, 2019

(86) PCT No.: PCT/IB2019/000257
§ 371 (c)(1),
(2) Date: Sep. 16, 2020

(87) PCT Pub. No.: WO2019/180503
PCT Pub. Date: Sep. 26, 2019

(65) Prior Publication Data
US 2021/0253940 A1 Aug. 19, 2021

Related U.S. Application Data

(60) Provisional application No. 62/646,456, filed on Mar. 22, 2018.

(51) Int. Cl.
E21B 43/24 (2006.01)
C09K 8/584 (2006.01)
C09K 8/592 (2006.01)
C09K 8/594 (2006.01)

(52) U.S. Cl.
CPC .............. *C09K 8/584* (2013.01); *C09K 8/592* (2013.01); *C09K 8/594* (2013.01); *E21B 43/24* (2013.01)

(58) Field of Classification Search
CPC .......... C09K 8/584; C09K 8/592; E21B 43/24
USPC ....................................................... 166/268
See application file for complete search history.

(56) References Cited

U.S. PATENT DOCUMENTS

| | | | |
|---|---|---|---|
| 4,577,688 A | 3/1986 | Gassmann et al. | |
| 4,637,466 A * | 1/1987 | Hawkins ................. | E21B 43/24 166/272.5 |
| 4,637,766 A | 1/1987 | Milliser | |
| 5,046,560 A * | 9/1991 | Teletzke .................. | E21B 43/24 166/305.1 |
| 2013/0327523 A1* | 12/2013 | Santa ....................... | C09K 8/58 166/305.1 |
| 2014/0034307 A1* | 2/2014 | Southwick ............. | C09K 8/588 166/270.1 |

* cited by examiner

*Primary Examiner* — Zakiya W Bates
*Assistant Examiner* — Ashish K Varma
(74) *Attorney, Agent, or Firm* — Bushman Werner, P.C.

(57) ABSTRACT

Recovering heavy oil from a subterraneous formation penetrated by at least one injection well and one production well, by injecting into the injection well a mixture of steam and an alkyl alkoxylated carboxylate salt, increasing the apparent viscosity of the steam while at the same time lowering the steam mobility, and recovering oil from the subterranean formation.

6 Claims, 6 Drawing Sheets

ALKYL ALKOXYLATED CARBOXYLATE SALTS AS STEAM FOAM ADDITIVES FOR HEAVY OIL RECOVERY

CROSS-REFERENCE TO RELATED APPLICATION

This application is a national phase of PCT/162019/000257 filed Mar. 15, 2019, which in turn claims priority to U.S. Application No. 62/646,456 filed on Mar. 22, 2018, the disclosures of which are incorporated herein by reference for all purposes.

FIELD OF THE INVENTION

The present invention relates to steam foam additives and method of use thereof for heavy oil recovery and, in particular, relates to surfactants which are thermally stable and decrease the mobility of steam. Specifically, the surfactants comprise primarily alkyl alkoxylated carboxylate salts.

BACKGROUND OF THE INVENTION

The present invention relates to a foam-forming surfactant and method for improving the recovery of heavy oil from subterranean wells.

As more light oil reservoirs have either depleted or reached their economic limit, the percentage of heavy oils in world oil production continues to rise. However, the recovery of heavy oils can be challenging due to their extremely high viscosity at formation temperature and the low permeability of the sand formations (Larter et al., 2006). Conventional technologies for heavy oil recovery, therefore, must apply heat in the process to melt the oils in order to mobilize them for effective recovery. Some technologies use steam as the source of heat. Some generate heat by in-situ combustion or electrical heating (Nasr and Ayodele, 2005; Szasz and Berry Jr., 1963; Alvarez and Han, 2013).

Steam injection has been demonstrated as one of the most effective recovery methods for heavy oils by heating the formation, lowering the viscosity of the heavy oils and thus enhancing the flow of the heavy oils toward the production wells. For example, steam-assisted gravity drainage (SAGD) has been the most common method in temperature infused recovery technologies for heavy oils. In this process, steam is injected into the steam-injection well. The steam rises due to buoyancy forces and forms a steam chamber above the well. The heat in the steam chamber softens the oil so it melts and drains into the production well located under the injection well. The oil, along with the condensed water from steam, can be pumped to the surface and separated from water. Modifications to the SAGD process to improve the oil recovery such as solvent-steam injection and convective SAGD have been evaluated (Sood, 2016; Nasr et al., 2003). However, steam injection in the thermal processes such as SAGD, steam drive and cyclic steam has its own problems including steam override and steam channeling, resulting in low oil recovery in low permeability zones (Zhang et al., 2007; Castanier and Brigham, 1991). The steam override occurs when the gravitational force causes the low-density steam to rise to the top of the formation and bypass a significant fraction of initial oil in place in the lower part of the reservoir. Steam channeling is observed when the steam channels through relatively high-permeability zones and displaces oil from that zone while bypassing a significant fraction of oil in lower-permeability zones (Duerksen, 1986; Eson, 1983; Chen et al., 2010). Both phenomena occur due to the low steam viscosity and can result in high cost of steam generation and low oil recovery.

It has been demonstrated in prior art literature that surfactants, injected along with steam, create a steam foam flood that improves the steam flood process in heavy oil recovery. The presence of foam creates a barrier that slows the movement of the steam to both upper levels of the formation and towards the production wells, resulting in the distribution of steam to low permeability zones of the reservoir and transfer heat more efficiently to the oil to reduce oil viscosity. In other words, the issues of steam override and channeling can be overcome by an increase in steam apparent viscosity by surfactant foams. As a result, the average residual oil saturation in the reservoir is reduced.

Prior art systems described for anionic surfactants focused mostly on sulfonate surfactants as foaming agents for steam EOR processes, at operating temperatures up to 200° C. (Gassmann et al., 1984; Huang et al., 1984; Muijs et al., 1988; Wall, 1989; Cuenca et al., 2014). Some carboxylates were also reported as steam foaming agents at up to 180° C. (Hawkins and Schievelbein, 1986). There is a continued need for enhanced oil recovery techniques from various oil-bearing formations, such as subterranean oil wells as well as tar or oil sands. The further need to perform such recovery methods at elevated temperatures, such as used in steam applications, are well met by the compounds and methods described in the current invention.

SUMMARY OF THE INVENTION

The present invention has gone beyond the prior art and discovered a group of anionic surfactants, specifically surface active salts of alkyl alkoxylated carboxylates, that demonstrates the thermal stability and generates strong stable foam at up to 250° C. in the presence of oil. The structures of the identified surfactants can be tailored with respect to surfactant hydrophobicity to optimize the transport and thermodynamic properties of the surfactants and foam, in order to target reservoir temperature and salinity. Such tailoring is affected by careful design, taking into account the alkyl group's carbon chain length, nature of branching, choice of alkoxylation agent, alkoxylation grade as well as the neutralization agent utilized for salt formation.

The present invention demonstrates a method of steam injection using thermally stable surfactants which generate strong stable foam under steam conditions. The surfactant structures of the present invention consist of long chain alkyl alkoxylated carboxylate salts as steam foam additives for heavy oil recovery. The purpose is to use the surfactant foam at steam conditions to decrease the steam mobility by increasing the apparent viscosity of the steam. Of special interest is the ability of these surfactant structures to be thermally stable and to generate stable foam at steam conditions of up to 250° C.

The present invention teaches the use of anionic surfactant as a steam foam additive in heavy oil recovery comprising:

an alkyl alkoxylated carboxylate salt, wherein the alkyl alkoxylated carboxylate salt has a molecular structure as shown in (I):

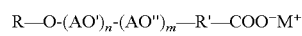

$$R\text{—}O\text{-}(AO')_n\text{-}(AO'')_m\text{—}R'\text{—}COO^-M^+ \quad\quad [I]$$

wherein

R is a branched alkyl group, a linear alkyl group, or a mixture of branched and linear alkyl groups, having from 16 to 36 carbon atoms, preferably 20 to 26 carbon atoms, most preferably 24 carbon atoms, AO' is an ethoxy (EO) or a propoxy (PO) group,
AO" is an EO or a PO group,
R' is a methylene or an ethylene or a propylene group,
n=1-15,
m=0-15,
m+n≤20,
provided, in the case where both PO and EO groups are present, the PO/EO molar ratio is less than 1, and
$M^+$ is an alkali metal ion (e.g., sodium), an alkanol amine ion (e.g. mono-ethanol amine (MEA), di-ethanol amine (DEA), tri-ethanol amine (TEA), mono-isopropanol amine (MIPA), di-isopropanol amine (DIPA) and tri-isopropanol amine (TIPA)), or other neutralising agent (e.g. an alkyl amine ion or an ammonium ion).

It will be recognized by those of skill in the art that depending on the alcohol used to form the hydrophobe the linear chain molecules may include a small percentage of branched molecules, though it is generally referred to as linear. Likewise, branched chain molecules may have a small percentage of linear molecules, though it is generally referred to as branched. Accordingly, as used herein the term "linear" means 90% to 100% linear, and thus may include a small amount of branched molecules. As used herein the term "branched" means 95% to 100% branched, and thus may include a small amount of linear molecules. A mixture of linear and branched has between 10% and 95% branched molecules.

In the present invention, in the case where R is branched or a mixture of linear and branched, preferably the branched molecules have an average number of 0.3 to 3.5 branches per molecule and at least one branch is in the 2-alkyl position.

In a preferred embodiment of the present invention, for the anionic surfactant disclosed herein above, R is a $C_{24}$ 2-alkylbranched group, and the PO/EO molar ratio is <1.

Another embodiment of the current invention is a method for heavy oil recovery from a subterranean formation that is penetrated by at least one injection well and one production well, comprising:
 i) Injecting into an injection well a mixture of steam and a surfactant, the surfactant comprising an alkyl alkoxylated carboxylate salt, disclosed herein above in formula [I];
 ii) increasing the apparent viscosity of the steam, and at the same time lowering the steam mobility, and
 iii) recovering heavy oil from the subterranean formation.

Suitable additives such as a co-surfactant for additional interfacial tension reduction or emulsification may optionally be added to the composition described above.

These and further features and advantages of the present invention will become apparent from the following detailed description, wherein reference is made to the figures in the accompanying drawings.

DETAILED DESCRIPTION OF PREFERRED EMBODIMENTS

Figure 1:
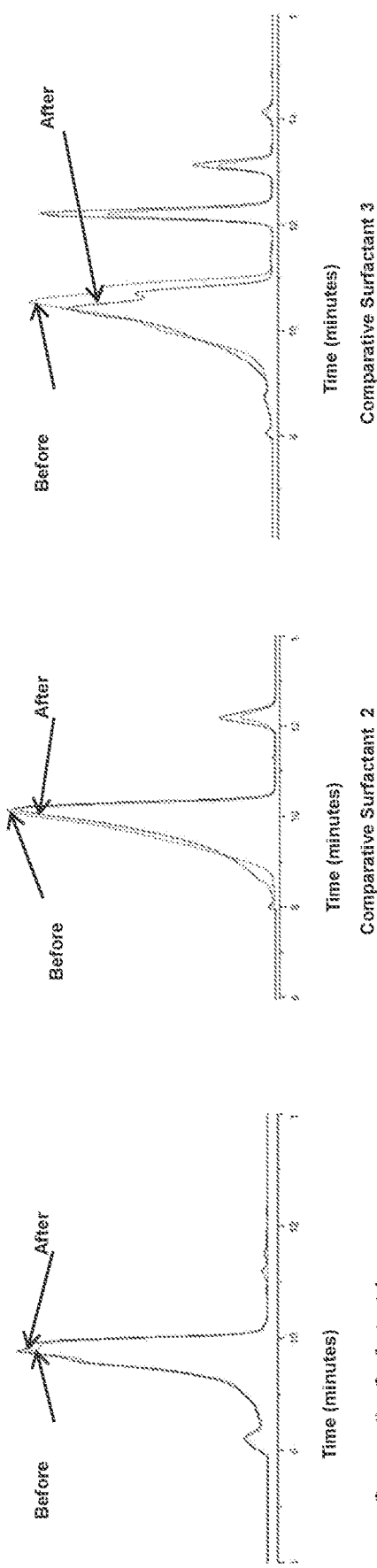
FIG. 1 shows HPLC profiles for surfactants of the present invention.

The alkyl alkoxylated carboxylate salts of the present invention are highly stable at steam temperature. Their performance can be improved by tailoring the hydrophobe structure (such as branching and chain length) and the levels of PO and EO units to the needs of the wells. For example, at steam conditions of 250° C. without the presence of oil, salts of long hydrophobe, with 20 or more hydrocarbons, alkyl alkoxylated carboxylates are required to generate stable foam that results in increased steam viscosity by more than 3 orders of magnitudes.

The following non-limiting examples will demonstrate the performance and advantages of the surfactants of the present invention.

As used herein the following terms are intended to have the meanings as indicated below with reference to the hydrophobic chain.
 short chain=a carbon chain of less than 10 carbon atoms (<C10)
 medium chain=a carbon chain having from 10 to 16 carbon atoms (C10 to C16)
 long chain=a carbon chain having greater than 16 carbon atoms (>C16)
 heavy chain=a carbon chain having greater than 20 carbon atoms (>C20)

These definitions are to clarify the language used herein and are not intended to limit the invention.

Materials

All the surfactants used in the following examples are anionic surfactants, in particular alkyl alkoxylated carboxylate salts. The surfactants are made up of short, medium, long, and heavy chain alcohols with propoxy and/or ethoxy units. The alkyl hydrophobes are either linear or branched. The surfactants used are described in Table 1. It will be understood that some of the surfactants tested are outside the scope of the present invention and are comparative examples to demonstrate the improved results produced by the present invention.

TABLE 1

| Surfactant | Alcohol name | Alcohol structure | Carbon chain length | Number of PO/EO | PO/EO molar ratio |
|---|---|---|---|---|---|
| Comparative Surfactant 1 (BS-POEO-A3) | Isononanol | branched, short chain | C9 | 1.6PO/2.4EO | PO/EO < 1 |
| Comparative Surfactant 2 (BM-EO) | ITDA (isotridecanol; MARLIPAL O13) | branched, medium chain | C13 | 7EO | EO only |

TABLE 1-continued

| Surfactant | Alcohol name | Alcohol structure | Carbon chain length | Number of PO/EO | PO/EO molar ratio |
|---|---|---|---|---|---|
| Comparative Surfactant 3 (LM-EO) | NAFOL 1214 | linear, medium chain | C12/C14 | 4.5EO | EO only |
| Comparative Surfactant 4 (LM-EO) | NAFOL 1214 | linear, medium chain | C12/C14 | 7EO | EO only |
| Comparative Surfactant 5 (LM-POEO-A3) | NAFOL 1214 | linear, medium chain | C12/C14 | 2PO/5EO | PO/O < 1 |
| Comparative Surfactant 6 (BM-EO) | ISALCHEM 123 | 2-alkyl branched, medium chain | C12/C13 | 7EO | EO only |
| Comparative Surfactant 7 (BL-EO) | LIAL 167 | mixture of linear and 2-alkyl branched, long chain | C16/C17 | 7EO | EO only |
| Surfactant 8 (BL-POEO-A3) | LIAL 167 | mixture of linear and 2-alkyl branched, long chain | C16/C17 | 2PO/5EO | PO/EO < 1 |
| Comparative Surfactant 9 (LL-POEO-A1) | NAFOL 1618 | linear, long chain | C16/C18 | 4.5PO/2EO | PO/EO > 1 |
| Surfactant 10 (LL-POEO-A2) | NAFOL 1618 | linear, long chain | C16/C18 | 4.5PO/5EO | PO/EO ~ 1 |
| Surfactant 11 (LL-POEO-A3) | NAFOL 1618 | linear, long chain | C16/C18 | 2PO/5EO | PO/EO < 1 |
| Comparative Surfactant 12 (LH-EO) | NAFOL 20+ | linear, heavy chain | C20+ | 7EO | EO only |
| Surfactant 13 (LH-POEO-A3) | NAFOL 20+ | linear, heavy chain | C20+ | 2PO/5EO | PO/EO < 1 |
| Comparative Surfactant 14 (BM-EO) | ISOFOL 12 | 2-alkyl branched, medium chain | C12 | 7EO | EO only |
| Comparative Surfactant 15 (BM-POEO-A3) | ISOFOL 12 | 2-alkyl branched, medium chain | C12 | 2PO/5EO | PO/EO < 1 |
| Comparative Surfactant 16 (BL-EO) | ISOFOL 20 | 2-alkyl branched, long chain | C20 | 7EO | EO only |
| Surfactant 17 (BL-POEO-A3) | ISOFOL 20 | 2-alkyl branched, long chain | C20 | 2PO/5EO | PO/EO < 1 |
| Surfactant 18 (BH-POEO-A3) | ISOFOL 24 | 2-alkyl branched, heavy chain | C24 | 2PO/5EO | PO/EO < 1 |
| Surfactant 19 (BH-POEO-A3) | ISOFOL 28 | 2-alkyl branched, heavy chain | C28 | 2PO/5EO | PO/EO < 1 |

Thermal Stability Test

As used herein, the term "thermal stability" refers to the surfactant activity remaining unchanged for a period of time under predetermined conditions. The thermal stability test was performed in a high temperature high pressure (HTHP) Parr reactor at 200 and 250° C. The surfactant was prepared at 1 wt % in solution with 1 wt % NaCl. Before the Parr reactor was heated up to the desired temperature, nitrogen gas was purged slowly through the solution to remove oxygen and the Parr reactor was pre-pressurized to 300 psi. Three samples of each surfactant solution were aged in the Parr reactor, one sample was aged for 1 day, one sample for 1 week, and one sample for 2 weeks. The surfactant profile in the solution before and after aging time was analyzed by High Performance Liquid Chromatography (HPLC) to determine the degradation of the surfactant. Changes in the HPLC profile, typically the decrease in the surfactant peak area, indicate the degradation of the surfactant.

The thermal stability of the studied surfactants was evaluated at 200 and 250° C., indicated by changes in the HPLC profiles of the surfactants in solutions before and after being aged. FIG. 1 shows the HPLC profiles for three surfactants Comparative Surfactant 1, Comparative Surfactant 2 and Comparative Surfactant 3 at 250° C. for a 1 day test.

Among the three surfactants, Comparative Surfactant 3 showed the highest degree of degradation, much higher than that of Comparative Surfactant 2. Comparative Surfactant 3 and Comparative Surfactant 2 are both made up of medium chain alcohols with similar EO content; however, Comparative Surfactant 3 has a linear hydrophobe while Comparative Surfactant 2 has a branched hydrophobe. This indicates that the branching structure of the hydrophobe slows down the degradation of the surfactants. Comparative Surfactant 1 showed negligible degradation, as indicated by the almost identical HPLC profile of the surfactant before and after the aging process. Comparative Surfactant 1 is made up of branched short chain alcohol with both PO and EO units. The result indicates that the thermal stability of the surfactant is improved not only by having the branched structure hydrophobe but also with the addition of the PO units, which increases the hydrophobicity of the surfactant.

Figure 2:
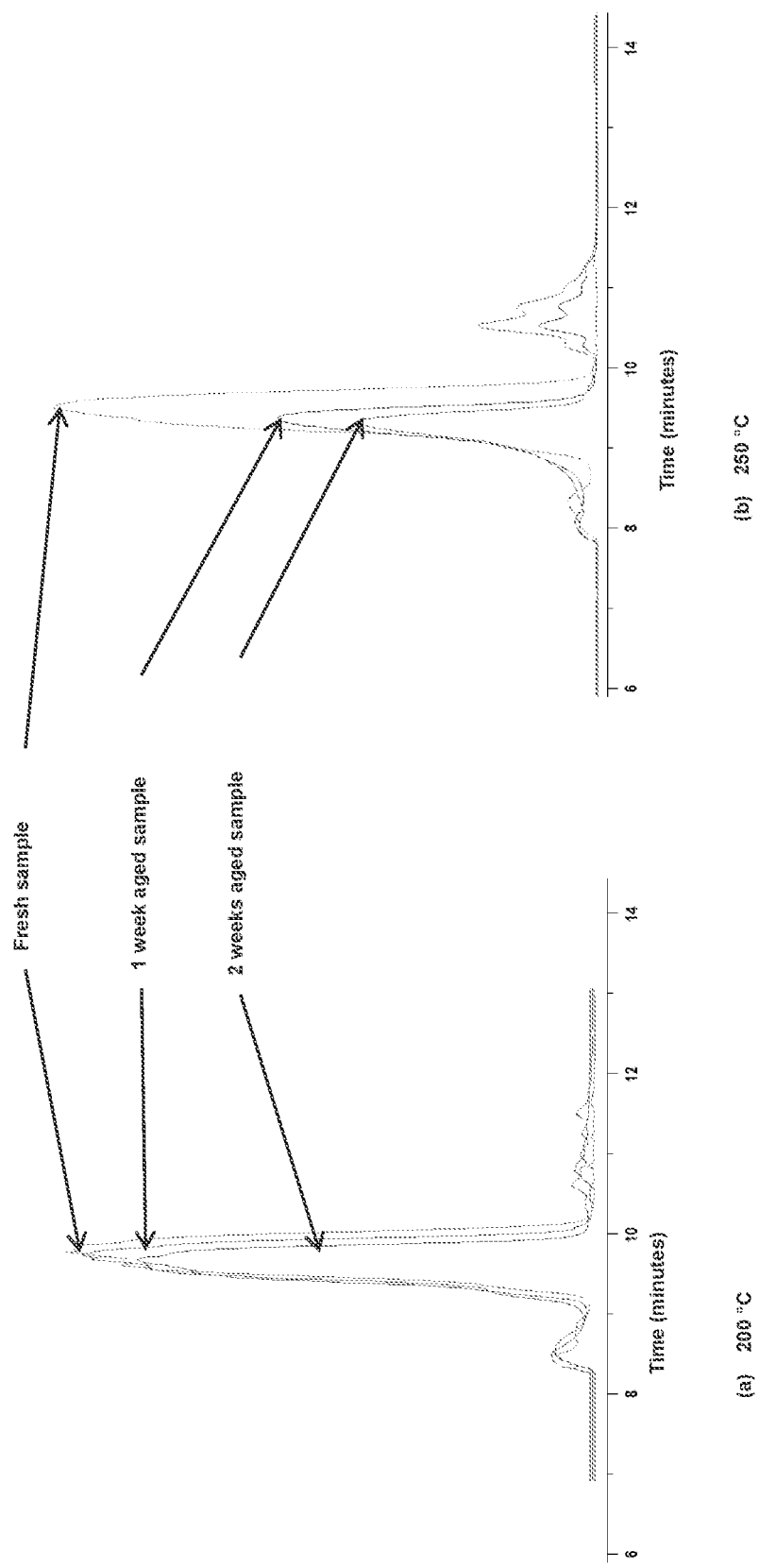
FIG. 2 shows the thermal stability of surfactants of the present invention before and after being aged.

The thermal stability of Comparative Surfactant 1 was evaluated further for a longer period of time at 1 and 2 weeks. The results are shown in FIG. 2.

It can be seen that for the same aging period of 2 weeks, Comparative Surfactant 1 starts showing a more significant degradation at 250° C. than at 200° C. Table 2 summarises the remaining amount of surfactant after each aging period at both temperatures.

TABLE 2

| Time (week) | 200° C. | 250° C. |
|---|---|---|
| 0* | 100% | 100% |
| 1 | 94% | 52% |
| 2 | 79% | 38% |

*Fresh sample before the aging process

Figure 3:
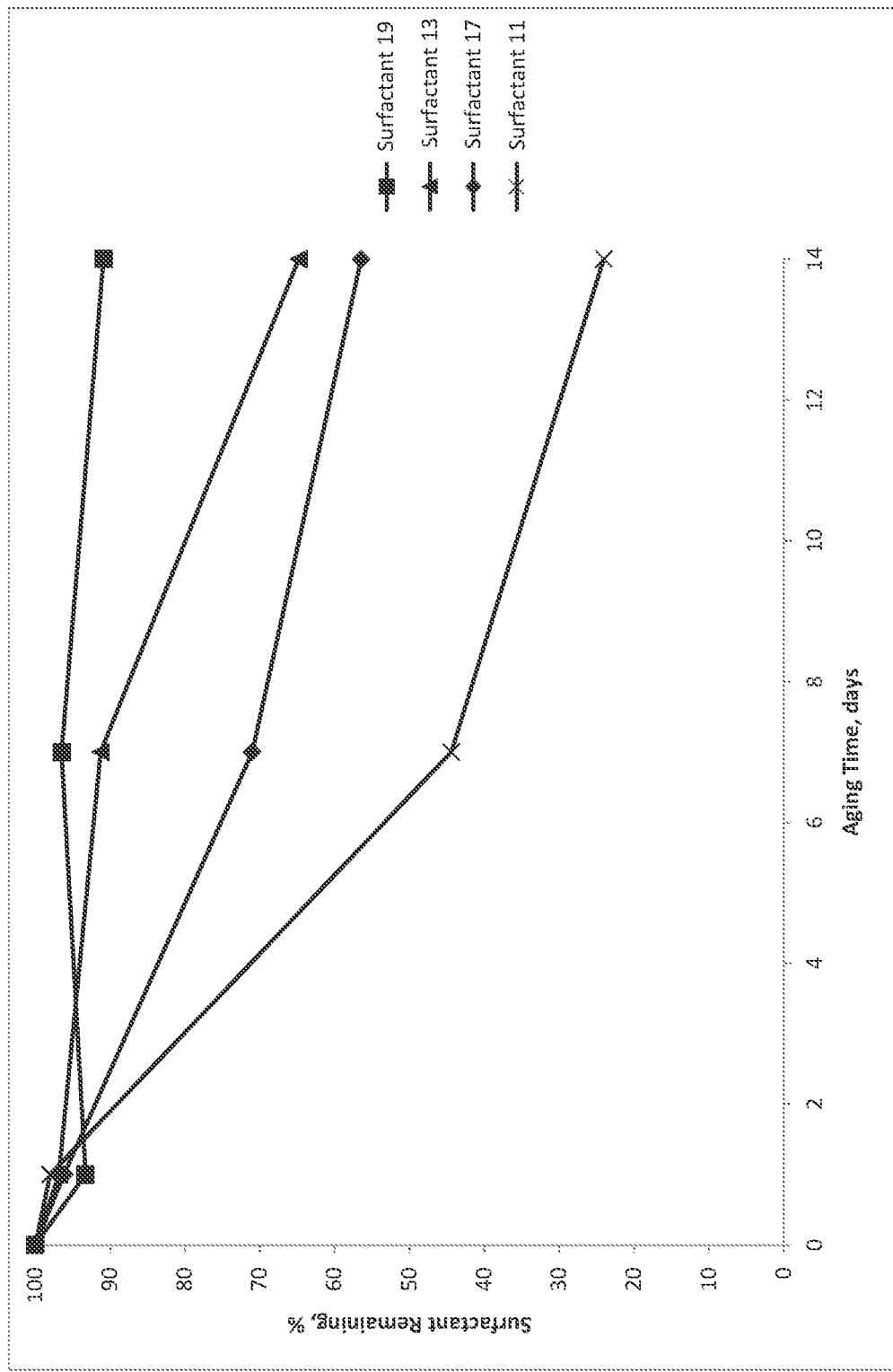
FIG. 3 is a graph showing the percent of remaining of surfactants of the present invention after aging.

At 200° C., there was still 79% surfactant left after 2 weeks, but only 38% left at 250° C. Based on the effect of the surfactant structure on the thermal stability, it is hypothesized that long chain hydrophobes, especially branched, and the addition of PO units improve the thermal stability of the surfactants at high temperature. This hypothesis is demonstrated in FIG. 3. The results show that hydrophobe branching and chain length significantly impact the thermal stability of the surfactant.

Table 3 summarises the remaining amount of surfactant (%) after each aging period at 250° C., for some of the surfactants evaluated.

TABLE 3

| Surfactant | Alcohol name | Carbon length chain | Number of PO/EO | Thermal stability @ 250° C. [%] | | |
|---|---|---|---|---|---|---|
| | | | | one day | one week | two weeks |
| Comparative Surfactant 1 (BS-POEO-A3) | Isononanol | C9 | 1.6PO/ 2.4EO | — | 52.0 | 38.0 |
| Comparative Surfactant 4 (LM-EO) | NAFOL 1214 | C12/14 | 7EO | 100 | 85.5 | 76.0 |
| Surfactant 11 (LL-POEO-A3) | NAFOL 1618 | C16/ C18 | 2PO/5EO | 100 | 45.4 | 23.9 |
| Surfactant 12 (LH-POEO-A3) | NAFOL 20+ | C20+ | 2PO/5EO | 96.9 | 91.3 | 64.8 |
| Surfactant 17 (BL-POEO-A3) | ISOFOL 20 | C20 | 2PO/5EO | 96.2 | 71.0 | 56.5 |
| Surfactant 18 (BH-POEO-A3) | ISOFOL 24 | C24 | 2PO/5EO | 93.3 | 96.5 | 90.0 |

The heavy branched hydrophobe (C20+) Surfactant 18 demonstrated to be highly stable with 90% surfactant activity remaining after 2 weeks at 250° C.

Bulk Foam Performance

The bulk foam performance of the surfactants was evaluated at 250° C. in a high temperature high pressure (HTHP) vessel. The vessel was filled with 33 mL of the surfactant solution at 0.5 wt %. The back pressure regulator was set at 800 psi. The vessel was pre-pressurized to 800 psi with nitrogen gas before being heated up to the test temperature of 250° C. Once the oven temperature control indicated 250° C., the solution was incubated for 30 minutes to ensure the solution temperature reached 250° C. before nitrogen was injected from the bottom of the vessel to generate foam. The nitrogen gas was continuously injected at 1000 psi until the foam reached its maximum volume in the vessel, at which the foam volume was noted. The foam was visually observed through the sapphire window on the side of the vessel. The foam volume was recorded every two minutes until the foam completely decayed. The foam performance of the surfactant was quantified and expressed as the percentage of foam volume generated per the initial liquid volume that was used to generate the foam, as shown in Table 4.

TABLE 4

| Surfactant | Carbon chain length | Number of PO/EO | Initial foam, vol % | Foam at 2 minutes, vol % | Foam at 4 minutes, vol % | Foam at 6 minutes, vol % |
|---|---|---|---|---|---|---|
| Comparative Surfactant 3 (LM-EO) | C12/C14 | 4.5EO | No foam | | | |
| Comparative Surfactant 4 (LM-EO-A2)* | C12/C14 | 7EO | 50% | 8% | 8% | 8% |
| Comparative Surfactant 5 (LM-POEO-A3) | C12/C14 | 2PO/5EO | 37% | 21% | 13% | 8% |
| Comparative Surfactant 2 (BM-EO) | C12/C13 | 7EO | No foam | | | |
| Comparative Surfactant 7 (BL-EO) | C16/C17 | 7EO | No foam | | | |
| Surfactant 8 (BL-POEO-A3) | C16/C17 | 2PO/5EO | 111% | 79% | 18% | 11% |
| Comparative Surfactant 12 (LH-EO) | C20+ | 7EO | No foam | | | |
| Surfactant 13 LH-POEO-A3 | C20+ | 2PO/5EO | 282% | 151% | 58% | 34% |
| Comparative Surfactant 14 (BM-EO) | C12 | 7EO | 42% | 24% | 5% | 5% |
| Comparative Surfactant 15 (BM-POEO-A3) | C12 | 2PO/5EO | 29% | 11% | 8% | 8% |
| Comparative Surfactant 16 (BL-EO) | C20 | 7EO | No foam | | | |
| Surfactant 17 (BL-POEO-A3) | C20 | 2PO/5EO | 197% | 184% | 58% | 16% |
| Surfactant 18 (BH-POEO-A3) | C24 | 2PO/5EO | 247% | 187% | 79% | 63% |
| Surfactant 19 (BH-POEO-A3) | C28 | 2PO/5EO | Insoluble | | | |

*Comparable to prior art surfactant Agent 1 from U.S. Pat. 4,637,466.

Since the starting surfactant concentration in the thermal stability experiments was 1 wt % and most of the studied surfactants had at least 50% surfactant remaining at 250° C.

after two weeks, the bulk foam test was performed at 0.5 wt % surfactant concentration and 250° C.

The bulk foam test was first performed on EO only surfactants and the results at 250° C. were summarized in Table 4. These surfactants have similar percentages of EO in their molecular structures. Only two surfactants were able to generate a small amount of foam while the rest did not show any foam activity. This could be due to the fact that as the hydrophobe chain length increases, the surface activity of the surfactant decreases. Therefore, the long chain hydrophobe was not able to create a stable enough film between the liquid and the air to create foam bubbles. These surfactant structures can be compared and are close in structure to the prior art example of C11/C15-7 EO surfactant claimed as steam foaming agents in prior arts.

The bulk foam performance of Comparative Example 4 and Surfactant 14 was compared with alkyl alkoxylated carboxylate salt surfactants of similar hydrophobe chain length but with both PO and EO in the molecular structure. As can be seen in Table 4, having PO units in the molecular structure of these medium chain hydrophobes provides no significant improvement in the foam performance at 250° C.

For the longer hydrophobe PO/EO alkyl alkoxylated carboxylate salts, the effect of the hydrophobe chain length on the foam performance at steam conditions was studied with alkyl alkoxylated carboxylate salts that have similar levels of PO and EO but varied hydrophobe chain lengths. The results showed that as the hydrophobe chain length increases, the foam volume generated at 250° C. significantly increased. The foam volume doubles to triples as the hydrophobe chain length increases from C12, C14 to C16, C17. However, the foam stability was not improved by this increase in the hydrophobe chain length. In both cases, the foam decayed almost completely after six minutes. As the hydrophobe chain length was increased to C20 and higher, both the foam volume and foam stability improved, more significantly on the foam volume. The long and highly branched Surfactant 18 noticeably showed significantly higher foam volume and foam stability at 250° C. The linear Surfactant 13 showed a slightly higher foam volume and foam stability than the branched Surfactant 17. This could be due to the shorter backbone hydrophobe of the Surfactant 17 due to the branching.

In particular, surfactant Comparative Example 4, which is a representative example of U.S. Pat. No. 4,637,466, incorporated herein by reference for all purposes, had inferior foam volume and foam stability compared to the longer chain surfactants of the present invention.

Sand-Packed Column Test

To replicate downhole performance, the foaming performance of the chemically stable surfactants at steam condition was evaluated in sand-packed columns. Good foam performance was determined based on the steam apparent viscosity, which was calculated from the measured pressure drop across the sand-packed columns using Darcy's law, as an indication of foam propagation and strength during steam injection at temperatures up to 250° C., with and without the presence of bitumen. Ottawa sand was used.

Selected surfactants at 0.5 wt % were heated up to 250° C. before being co-injected into the sand-packed column with steam at 75% quality (i.e. volume fraction of steam in the injected mixture of steam and surfactant solution) at up to 250° C.

The sand-packed column experiments were carried out following the procedure described in Table 5.

TABLE 5

| No bitumen | With bitumen |
|---|---|
| 1. Inject approximately 40 PV of 1 wt % KCl solution for cleaning sand pack (at room temperature) | 1. Inject approximately 40 PV of 1 wt % KCl solution for cleaning san pack (at room temperature) |
| 2. Simultaneously inject KCl solution and gas at different rates | 2. Saturate the sand-packed column with bitumen |
| 3. Simultaneously inject 0.5 wt % surfactant solution and gas at different rates | 3. Waterflood the sand-packed column with 1 wt % KCl solution |
| | 4. Simultaneously inject KCl solution and gas at different rates |
| | 5. Simultaneously inject 0.5 wt % surfactant solution and gas at different rates. |

The sand-packed column dimension is 1 in. ID×12 in. length. The pressure drop across the column during the steam injection was recorded. The sand-packed column was first saturated with 1 wt % KCl brine solution with about 40 pore volume (PV). The permeability of the column was calculated from this first step based on Darcy's law (Eq. 1):

$$q = -\frac{kA(p_b - p_a)}{\mu L} \quad (1)$$

wherein
A=area, $m^2$
k=permeability, $m^2$
L=length, m
$p_b - p_a$=pressure drop (Pa)
q=flowrate, $m^3/s$
μ=viscosity, Pa·s The injection rate in each stage of the sand-packed column experiments is shown in Table 6.

TABLE 6

| Injection Rate | Brine only at room condition | Brine/gas at steam condition | Surfactant/gas at steam condition |
|---|---|---|---|
| Initial rate | 13.33 cc/min | Brine: 3.33 cc/min<br>$N_2$ gas: 10 cc/min | Surfactant: 3.33 cc/min<br>$N_2$ gas: 10 cc/min |
| Doubled rate | 26.66 cc/min | Brine: 6.66 cc/min<br>$N_2$ gas: 20 cc/min | Surfactant: 6.66 cc/min<br>$N_2$ gas: 20 cc/min |

Darcy's law was then applied to calculate the steam apparent viscosity during the injection of KCl solution (as a baseline without surfactant) and surfactant solution at steam condition (200 or 250° C.), which shows the steam apparent viscosity without and with surfactant, respectively, in order to evaluate the effect of surfactant foam on the steam apparent viscosity. The back pressure of the column was monitored at 710 psi.

The apparent viscosity of steam without surfactant was measured at 0.1 cP as the baseline reference. The foam performance of the surfactants was evaluated based on the pressure drop across sand-packed columns at steam condition. It was found that above 150° C., the studied short and medium chain surfactants such as Comparative Surfactant 1, Comparative Surfactant 2, and Comparative Surfactant 3 were not able to generate foam even though they were found to be thermally stable at up to 200° C.

Figure 4:
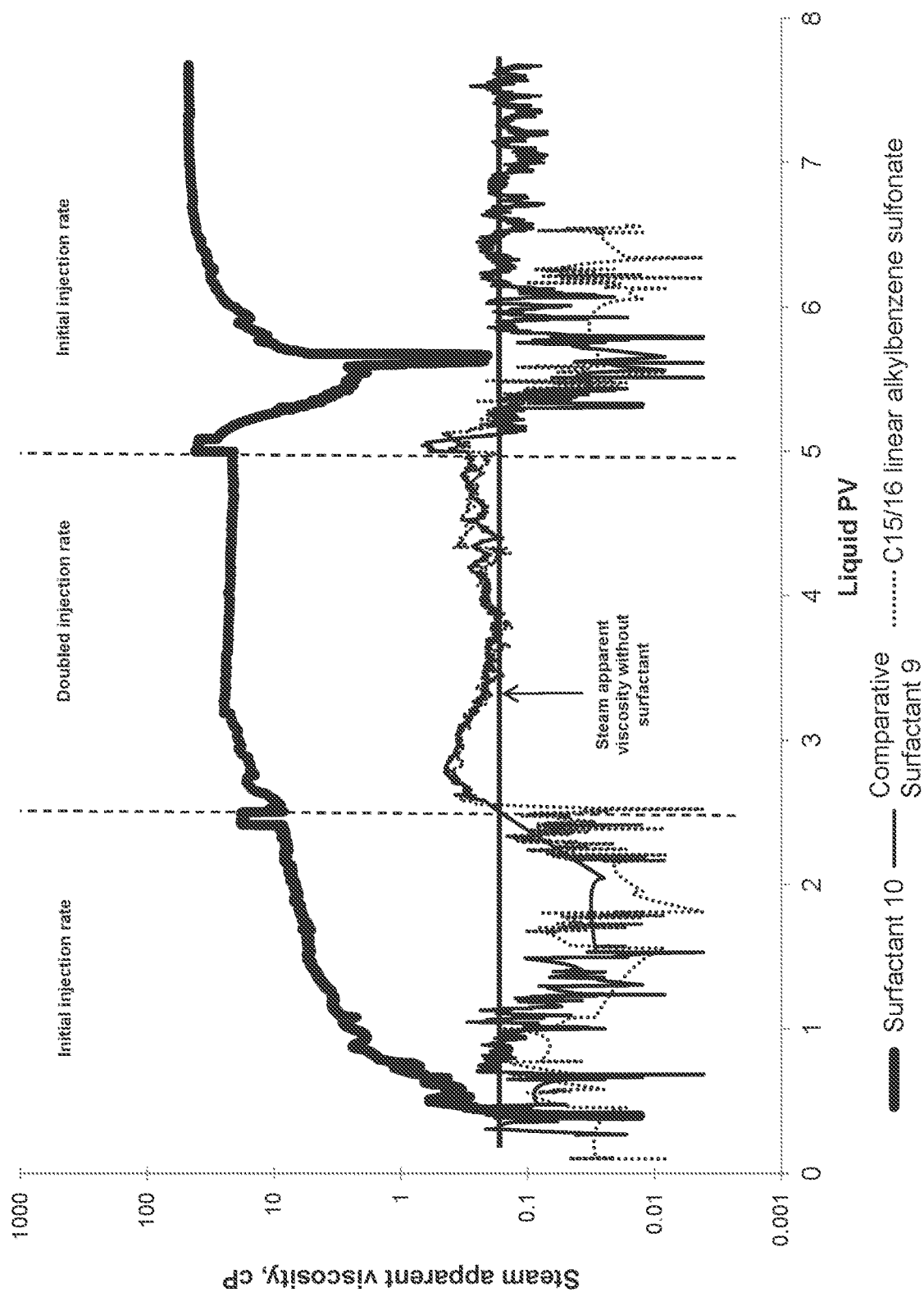
FIG. 4 shows foam performance of surfactants of the present invention as compared to a prior art surfactant.

As mentioned earlier, alkyl aryl sulfonates have been repeatedly reported in literature as good steam foaming agents (Muijs et al., 1988; Cuenca et al., 2014). FIG. 4 shows a comparison in foam performance of Comparative Surfactant 9 and Surfactant 10 with that of a prior art linear C15/16 alkyl benzene sulfonate at 200° C., without oil in sand-packed columns.

The foam performance of Comparative Surfactant 9 was comparable to that of prior art C15/16 linear alkylbenzene sulfonate, which was inferior to the foam performance of Surfactant 10 based on the ability of each surfactant foam to increase the steam apparent viscosity. The steam apparent viscosity was only slightly increased (less than 1 order of magnitude) by Comparative Surfactant 9 and the alkylbenzene sulfonate only at doubled gas and liquid injection rate. However, the apparent viscosity of steam was increased by two orders of magnitude by Surfactant 10 at both low and high injection rates at 200° C. The result indicates that the higher PO/EO molar ratio in Comparative Surfactant 9 makes this surfactant too hydrophobic for good foam generation as compared to Surfactant 10 that has a lower PO/EO molar ratio. It is, therefore, speculated that a surfactant with lower PO/EO molar ratio such as Surfactant 11 is desired for better foam performance at higher temperature than 200° C.

Figure 5:
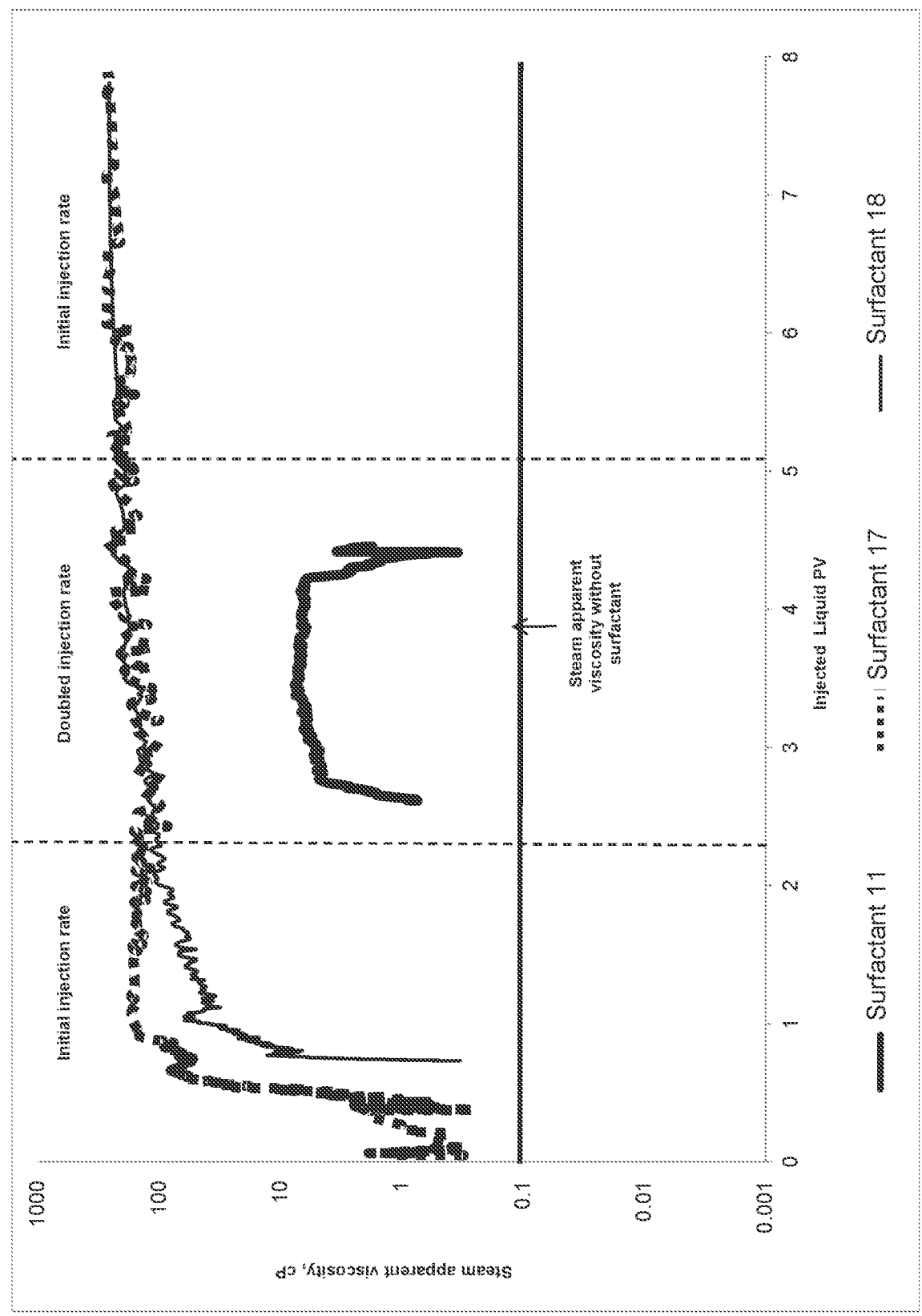
FIG. 5 shows the apparent steam viscosity of surfactants of the present invention in a sand-packed column without oil.

Based on the results of the thermal stability and the foam performance of the surfactants studied so far at up to 200° C., it is hypothesized that in order for a surfactant to have desirable thermal stability and foam performance at temperature higher than 200° C., the surfactant needs to have a molecular structure made up of a hydrophobe that is at least a long chain alcohol (C16+) in which branched structure is preferred with PO/EO molar ratio less than 1. This hypothesis is further supported by the foam performance tests of three surfactants of such structures (Surfactant 11, Surfactant 17, and Surfactant 18) in sand-packed columns at 250° C. It should be noted that all three surfactants have the same PO/EO molar ratio that is less than 1 with linear long hydrophobe (Surfactant 11), branched long hydrophobe (Surfactant 17), and branched heavy hydrophobe (Surfactant 18). The foam performance indicated by the steam apparent viscosity for the three surfactants at 250° C. without oil is shown in FIG. 5.

At 250° C. without oil, Surfactant 11 foam, which could only be generated at the doubled gas and liquid injection rate, increased the steam apparent viscosity by less than two orders of magnitude. However, the foam generated by the branched surfactants Surfactant 17 and Surfactant 18 was able to increase the steam apparent viscosity by at least three orders of magnitude to 100 cP at both initial and doubled gas and liquid injection rates. This indicates that the branched structure of the long and heavy chain hydrophobe surfactants significantly improves the surfactant foam performance at steam condition of 250° C., showing superior foam performance to the linear and shorter chain hydrophobe surfactants.

Since Surfactant 17 and Surfactant 18 surfactants exhibit strong and stable foam at 250° C. without oil, they were selected for the study of the foam performance in the presence of bitumen. The properties of the bitumen used in this study are summarized in Table 7.

TABLE 7

| Viscosity | Density |
|---|---|
| 915,000 cP at 20° C. | 929 kg/m$^3$ |
| 6.1 cP at 200° C. | 20.8° API |

Figure 6:
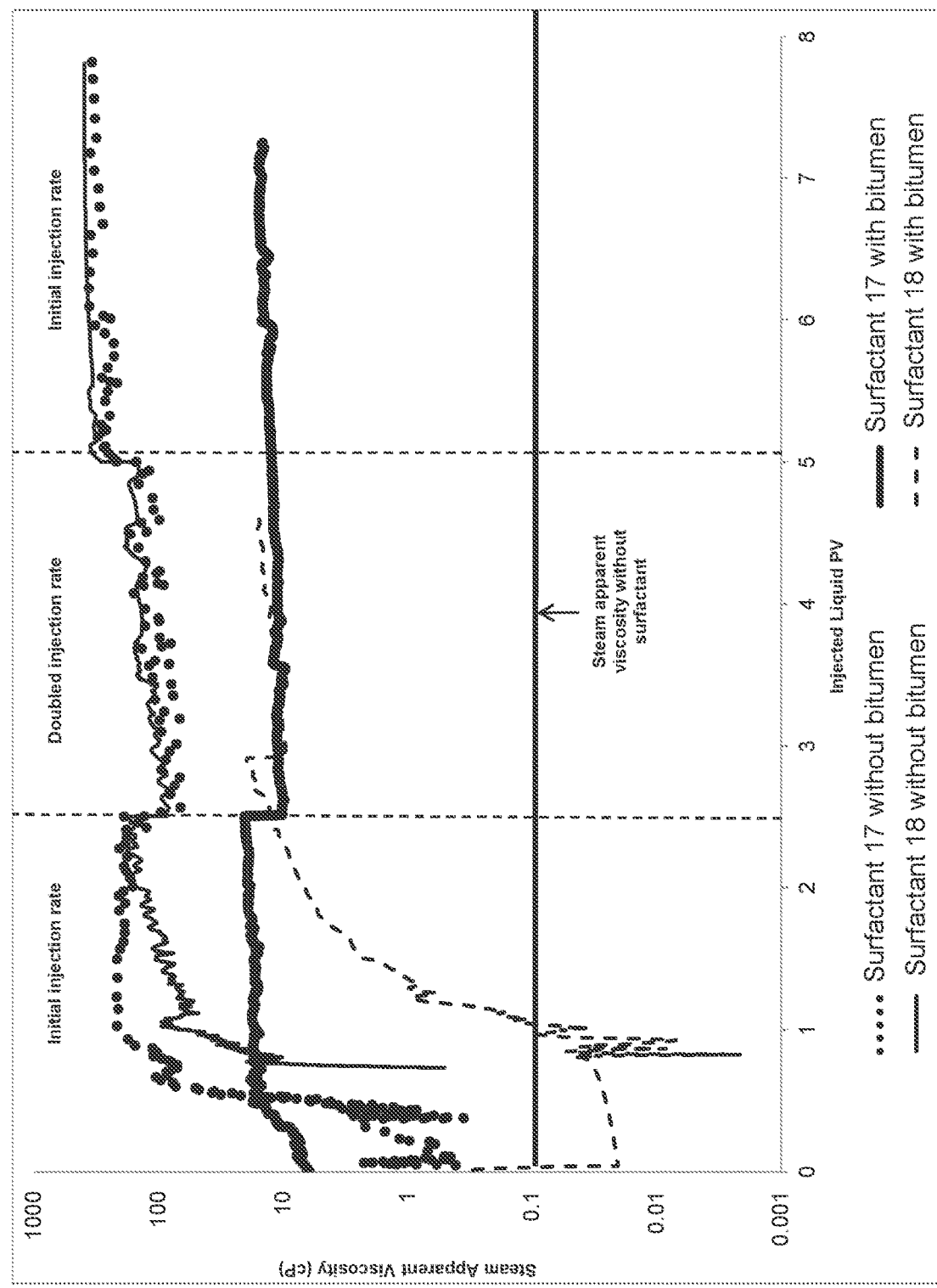
FIG. 6 shows the apparent steam viscosity of surfactants of the present invention in a sand-packed column with bitumen versus without bitumen.

FIG. 6 shows the effect of bitumen on the foam property of the surfactants or the steam apparent viscosity at 250° C. For both surfactants, the steam apparent viscosity in the presence of bitumen is decreased by one order of magnitude as compared to that without bitumen. However, the steam apparent viscosity in the presence of bitumen was still two orders of magnitude higher with surfactant foam than without surfactant foam. Thus, Surfactant 17 and Surfactant 18 demonstrated to be strong and stable foaming agents that significantly improve the steam mobility at 250° C. in the presence of bitumen.

The results of the above-described tests demonstrate that in order for a surfactant to have thermal stability and foam performance at temperatures higher than 200° C., the surfactant needs to have a molecular structure made up of a hydrophobe that is at least a long chain alcohol (C16+) in which branched structures are preferred with a PO/EO molar ratio less than 1. At higher temperatures, i.e., 250° C., the surfactant with branched heavy hydrophobe (C20+) was found to be highly stable with 90% surfactant remaining after 2 weeks. The structure-property relation established in the present invention is advantageous for developing a suitable surfactant foaming agent for a specific reservoir temperature and pressure. The surfactants of the present invention are beneficial in particular to the thermal steam EOR processes as they generate strong and stable foam under steam conditions that can overcome the steam override and channeling issues that result in low heavy oil recovery.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

REFERENCES

The following references are all incorporated herein by reference for all purposes.

Larter, S. R., Adams, J., Gates, I. D. et al. 2006. The Origin, Prediction and Impact of Oil Viscosity Heterogeneity on the Production Characteristics of Tar Sand and Heavy Oil Reservoirs. Presented at the Canadian International Petroleum Conference, Calgary, Alberta, 13-15 June. PETSOC 2006-134. https://doi.org/10.2118/2006-134.

Nasr, T. N. and Ayodele, O. R. 2005. Thermal Techniques for the Recovery of Heavy Oil and Bitumen. Presented at the SPE International Improved Oil Recovery Conference in Asia Pacific, Kuala Lumpur, Malaysia, 5-6 December. SPE 97488. https://doi.org/10.2118/97488-MS.

Szasz, E. and Berry Jr., V. J. 1963. Oil Recovery by Thermal Methods. Presented at the 6th World Petroleum Congress, Frankfurt am Main, Germany, 19-26 June. WPC-10138.

Alvarez, J. and Han, S. 2013. Current Overview of Cyclic Steam Injection Processes. *J Pet Sci Res,* 2(3): 116-127.

Sood, A. 2016. Convective SAGD Process. Presented at the SPE Canada Heavy Oil Technical Conference, Calgary, Alberta, 7-9 June. SPE-180734-MS. https://doi.org/10.2118/180734-MS.

Nasr, T. N., Beaulieu, G., Golbeck, H. et al. 2003. Novel Expanding Solvent-SAGD Process "ES-SAGD". *J Can Pet Technol*, 42 (1): 13-16. PETSOC-03-01-TN. https://doi.org/10.2118/03-01-TN.

Zhang, W., Youn, S. and Doan, Q. 2007. Understanding Reservoir Architectures and Steam-Chamber Growth at Christina Lake, Alberta, by Using 4D Seismic and Crosswell Seismic Imaging. *SPE Res Eval & Eng* 10 (5): 446-452. SPE-97808-PA. https://doi.org/10.2118/97808-PA.

Castanier, L. M. and Brigham, W. E. 1991. An Evaluation of Field Projects of Steam with Additives. *SPE Res Eng* 6 (1): 62-68. SPE-17633-PA. https://doi.org/11.2118/17633-PA.

Duerksen, J. H. 1986. Laboratory Study of Foaming Surfactants as Steam-Diverting Additives. *SPE Res Eng* 1 (1): 44-52. SPE-12785-PA. https://doi.org/10.2118/12785-PA.

Eson, R. L. 1983. Improvement in Sweep Efficiencies in Thermal Oil-Recovery Projects through the Application of In-Situ Foams. Presented at the SPE Oilfield and Geothermal Chemistry Symposium, Denver, Colo., 1-3 June. SPE-11806-MS. https://doi.org/10.2118/11806-MS.

Chen, Q., Gerritsen, M. G. and Kovscek, A. R. 2010. Improving Steam-Assisted Gravity Drainage Using Mobility Control Foams: Foam Assisted-SAGD (FA-SAGD). Presented at the SPE Improved Oil Recovery Symposium, Tulsa, Okla., USA, 24-28 April. SPE-129847-MS. https://doi.org/10.2118/129847-MS.

Gassmann, Z. Z., Hawkins, J. T. and Brown, A. 1984. Injection of Steam Foaming Agents into Producing Wells. U.S. Pat. No. 4,577,688.

Huang, W. S., Gassmann, Z. Z. and Hawkins, J. T. et al. 1984. Method of Improving Conformance in Steam Floods with Steam Foaming Agents. U.S. Pat. No. 4,540,050.

Muijs, H. M., Keijer, P. P. M and Wiersma, R. J. 1988. Surfactants for Mobility Control in High-Temperature Steam-Foam Applications. Presented at the SPE Enhanced Oil Recovery Symposium, Tulsa, Okla., 16-21 April. SPE-17361-MS. https://doi.org/10.2118/17361-MS.

Wall, R. G. 1989. Sequential Injection Foam Process for Enhanced Oil Recovery. U.S. Pat. No. 5,052,487.

Cuenca, A., Lacombe, E. and Morvan, M. et al. 2014. Design of Thermally Stable Surfactants Formulations for Steam Foam Injection. Presented at the SPE Heavy Oil Conference-Canada, Calgary, Alberta, Canada, 10-12 June. SPE-170129-MS. https://doi.org/10.2118/170129-MS.

Hawkins, J. T. and Scheivelbein, V. H. 1986. Method of Improving Conformance in Steam Floods with Carboxylate Steam Foaming Agents. U.S. Pat. No. 4,637,466.

What is claimed is:

1. A method for heavy oil recovery from a subterranean formation that is penetrated by at least one injection well and one production well, comprising:

i) injecting into an injection well a mixture of steam and a surfactant, said surfactant comprising an alkyl alkoxylated carboxylate salt, wherein said alkyl alkoxylated carboxylate salt has a molecular structure as shown in [1], wherein R is a linear, or branched, or mixture of linear and branched alkyl group, having from 16 to 36 carbon atoms, AO' is a propoxy (PO) group, AO" is an ethoxy (EO) or a PO group, R' is a methylene or an ethylene or a propylene group, n=1-15, m=0-15, m+n≤20, provided, in the case where both PO and EO groups are present, the PO/EO molar ratio is less than 1, provided that in the case where R includes branched alkyl groups, the branched molecules have an average number of 0.3 to 3.5 branches per molecule, and at least one branch is in the 2-alkyl position, and M' is an alkali metal ion, an alkanol amine ion, an alkyl amine ion, or an ammonium ion, ii) increasing the apparent viscosity of the steam, and at the same time lowering the steam mobility, and iii) recovering oil from the subterranean formation.

2. The method of claim 1, wherein R is a mixture of linear and branched alkyl groups.

3. The method of claim 1, wherein R is a branched alkyl group.

4. The method claim 1, wherein both PO and EO are present.

5. The method of claim 1 wherein R is 20 to 26 carbon atoms.

6. The method of claim 1 wherein $M^+$ is an alkali metal ion, an alkanol amine ion, or an ammonium ion.

* * * * *

UNITED STATES PATENT AND TRADEMARK OFFICE
CERTIFICATE OF CORRECTION

| | | |
|---|---|---|
| PATENT NO. | : 11,578,254 B2 | |
| APPLICATION NO. | : 16/981536 | |
| DATED | : February 14, 2023 | |
| INVENTOR(S) | : Nguyen et al. | |

It is certified that error appears in the above-identified patent and that said Letters Patent is hereby corrected as shown below:

In the Claims

Column 14, Line 14, please add --R-O-(AO')n-(AO")m-R'-COO- M+ [1]-- after "as shown in [1]," and before "wherein".

Signed and Sealed this
Thirtieth Day of May, 2023

Katherine Kelly Vidal
*Director of the United States Patent and Trademark Office*